US009236627B1

(12) United States Patent
Huang et al.

(10) Patent No.: US 9,236,627 B1
(45) Date of Patent: Jan. 12, 2016

(54) SOLID OXIDE REDOX FLOW BATTERY

(71) Applicant: University of South Carolina, Columbia, SC (US)

(72) Inventors: Kevin Huang, Export, PA (US); Xue Li, Columbia, SC (US)

(73) Assignee: University of South Carolina, Columbia, SC (US)

( * ) Notice: Subject to any disclaimer, the term of this patent is extended or adjusted under 35 U.S.C. 154(b) by 443 days.

(21) Appl. No.: 13/632,694

(22) Filed: Oct. 1, 2012

Related U.S. Application Data

(60) Provisional application No. 61/540,561, filed on Sep. 29, 2011.

(51) Int. Cl.
*H01M 8/06* (2006.01)
*H01M 8/04* (2006.01)

(52) U.S. Cl.
CPC .......... *H01M 8/065* (2013.01); *H01M 8/04216* (2013.01)

(58) Field of Classification Search
None
See application file for complete search history.

(56) References Cited

U.S. PATENT DOCUMENTS

| | | | |
|---|---|---|---|
| 5,492,777 A * | 2/1996 | Isenberg et al. ............... 429/419 | |
| 8,338,025 B2 | 12/2012 | Lu et al. | |
| 8,343,572 B2 | 1/2013 | Varade et al. | |
| 8,709,972 B2 | 4/2014 | Istvan et al. | |
| 2008/0029388 A1 * | 2/2008 | Elangovan et al. ........... 204/242 |
| 2008/0118635 A1 * | 5/2008 | Larsen .......................... 427/115 |
| 2009/0181274 A1 * | 7/2009 | Elangovan et al. ............. 429/30 |
| 2012/0034520 A1 | 2/2012 | Lu et al. |
| 2012/0058396 A1 | 3/2012 | Lu et al. |
| 2012/0077095 A1 * | 3/2012 | Roumi et al. ................. 429/405 |
| 2012/0135278 A1 | 5/2012 | Yoshie et al. |
| 2013/0183597 A1 * | 7/2013 | Pal et al. ....................... 429/422 |
| 2013/0189592 A1 | 7/2013 | Roumi et al. |
| 2014/0363747 A1 | 12/2014 | Evans et al. |

OTHER PUBLICATIONS

Huang et al., U.S. Appl. No. 13/649,827, filed Oct. 11, 2012, "Method of Making Redox Materials for Solid Redox Flow Battery".
Alotto et al.; "Redox Flow Batteries for large scale energy storage"; Publication Year 2012; Energy Conference and Exhibition (ENERGYCON), 2012 IEEE International; pp. 293-298.

* cited by examiner

*Primary Examiner* — Patrick Ryan
*Assistant Examiner* — Jose Colucci Rios
(74) *Attorney, Agent, or Firm* — Dority & Manning, P.A.

(57) ABSTRACT

A solid oxide redox flow battery is disclosed. The battery includes a solid oxide electrochemical cell integrated with a redox couple bed having a porous nanostructure with metal. The redox couple bed is configured to receive steam resulting in oxidation of the metal to produce hydrogen and the discharge of electricity from the battery. The redox couple bed in the discharged battery is further configured to receive hydrogen produced from the solid oxide electrochemical cell resulting in reduction of the metal oxide and recharge of the battery.

20 Claims, 6 Drawing Sheets

SOLID OXIDE REDOX FLOW BATTERY

BACKGROUND

Establishing an efficient and reliable transmission and distribution system for electrical energy produced from renewable resources as well as conventional power plants requires successful development and deployment of efficient electricity storage technology. Conventional rechargeable batteries are by far the most common form of electricity storage devices. Represented by lithium ion battery technology, this class of rechargeable batteries has been broadly used in small to medium scale electrical storage applications. Attempts to use this low-temperature battery technology for large scale grid energy storage, however, have so far proven difficult, primarily due to the concerns of safety and slow rate of rechargeability. On the other hand, high-temperature rechargeable battery technology, represented by sodium sulfur battery technology, is particularly capable of fast rechargeability, but faces challenges of inability of thermal cycling, high manufacturing cost and corrosion-shortened cycle life.

Therefore, there exists a need for a high-performance, low-cost and safe rechargeable battery system to satisfy the applications in grid energy storage.

SUMMARY

The present disclosure relates to a solid oxide redox flow battery (SORFB). The battery includes a solid oxide electrochemical cell having a redox couple bed having a porous nanostructured metal. The redox couple bed is configured to receive steam resulting in oxidation of the metal and the discharge of electricity from the battery. The redox couple bed in the discharged battery is further configured to receive hydrogen resulting in reduction of the metal oxide to metal and recharge of the battery.

In certain embodiments of the present disclosure a method of discharging and charging a solid oxide redox flow battery is described. The method includes feeding steam into a redox couple bed having a porous nanostructure with metal. Oxidation of the metal results in production of hydrogen and electricity is discharged from the battery using the produced hydrogen. The method also includes producing hydrogen by the reversible solid oxide electrochemical cell in the discharged battery resulting in reduction of the metal oxide into metal and recharge of the battery.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures in which.

DETAILED DESCRIPTION

Reference will now be made in detail to embodiments of the disclosed subject matter, one or more examples of which are set forth below. Each example is provided by way of explanation of the subject matter, not limitation of the subject matter. In fact, it will be apparent to those skilled in the art that various modifications and variations can be made in the present disclosure without departing from the scope or spirit of the subject matter. For instance, features illustrated or described as part of one embodiment, can be used on another embodiment to yield a still further embodiment.

The disclosed rechargeable battery features a novel cell structure including a solid oxide electrochemical cell and a redox couple bed. The present disclosure describes a rechargeable battery operating between fuel cell and electrolysis modes of a solid oxide electrochemical cell along with an "in-battery" $H_2$ generation and storage unit to realize charge/discharge characteristics. It is expected that this new type of high-temperature rechargeable battery can find applications in the large-scale stationary electricity storage for power generation industry.

Figure 1:
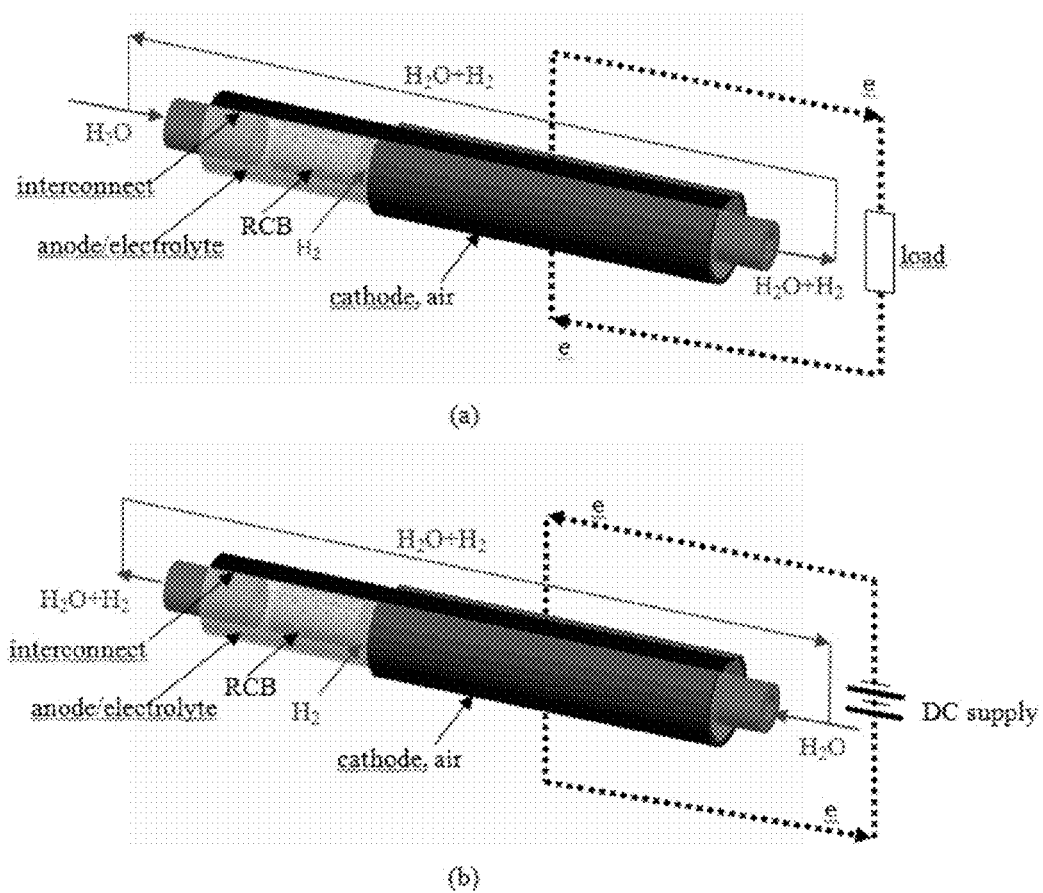
FIG. 1 illustrates a schematic illustration of an anode-supported tubular SORFB in (a) discharging mode, and (b) charging mode in accordance with certain embodiments of the present disclosure.

The battery cell described herein includes a solid oxide electrochemical cell and a redox couple bed (RCB), both of which operate at elevated temperatures. The working principle of such a rechargeable battery cell is schematically illustrated in FIG. 1. The solid oxide electrochemical cell is a conventional solid oxide fuel cell (SOFC).

The SOFC includes an electrolyte (such as a $Y_2O_3$-doped $ZrO_2$, or the like). The electrolyte conducts oxygen ions with the electronic conductivity being kept as low as possible to prevent losses from leakage currents. The high operating temperatures of SOFCs allow the kinetics of oxygen ion transport to be sufficient for good performance. Other suitable electrolyte materials can include yttria stabilized zirconia, scandia stabilized zirconia, strontium- and magnesium doped lanthanum gallate and gadolinium and samarium doped ceria or the like.

The SOFC further include an anode (such as a Ni—$ZrO_2$ cermet or the like). The anode layer can be porous and possess predominant electronic conductivity. Suitable materials can include a cerment made up of nickel combined with the ceramic material that is used for the electrolyte in that particular cell, typically YSZ (yttria stabilized zirconia), or the like. Additionally, the SOFC includes a cathode (such as a $La_{0.6}Sr_{0.4}Fe_{0.8}Co_{0.2}O_3$, or the like) and an interconnect (such as a doped-$LaCrO_3$, or the like). The interconnect can be either a metallic or ceramic layer that sits between each individual cell. Its purpose is to connect each cell in series, so that the electricity each cell generates can be combined.

The RCB holds a porous nanostructure made of a metal (Me) and its metal oxide ($MeO_x$) derivative. The discharging cycle, shown in FIG. 1(a), starts with the introduction of steam into the RCB. The interaction between steam and Me produces $H_2$ via the following reaction $$xH_2O + Me = xH_2 + MeO_x \tag{1}$$

The formed $H_2$ continues flowing towards the solid oxide electrochemical cell operating under the SOFC mode where it is electrochemically oxidized to generate electricity and steam via the following electrode reaction $$xH_2 + xO^{2-} = xH_2O + 2xe^- \quad (2)$$

When all of the active Me is chemically converted to $MeO_x$, the discharging process will stop. Until $MeO_x$ is reduced back to Me, the next discharging cycle cannot commence. This situation will require the charging cycle.

The purpose of the charging cycle is to convert $MeO_x$ to Me. One readily available method is to operate a solid oxide electrochemical cell under the electrolysis mode (also known as solid oxide electrolysis cell or SOEC) to generate $H_2$ from $H_2O$; the produced $H_2$ can then be used to reduce $MeO_x$ to Me. Therefore, a charging cycle of the battery cell starts with feeding steam from the side of SOEC where $H_2O$ is electrochemically split into $H_2$ by the following electrode reaction $$xH_2O + 2xe^- = xH_2 + xO^{2-} \quad (3)$$

The generated $H_2$ continues flowing towards the RCB where $MeO_x$ is reduced into Me by chemical reaction $$xH_2 + MeO_x = xH_2O + Me \quad (4)$$

When all the $MeO_x$ is reduced to Me by the SOEC-$H_2$, the charging cycle is completed. The freshly reduced active Me is then ready for the next discharging cycle.

At the air electrode, oxygen reduction and evolution take place as follows during the discharge and charge cycles.

$$1/2 O_2 + 2e^- \underset{charge}{\overset{discharge}{\rightleftharpoons}} O^{2-} \quad (5)$$

By combining reactions (1)-(5), the overall chemical reaction of the SORFB then becomes:

$$Me + \frac{x}{2}O_2 \underset{charge}{\overset{discharge}{\rightleftharpoons}} MeO_x \quad (6)$$

In essence, reaction (6) indicates the disclosed battery as a "metal-air" battery. Different from conventional low-temperature metal-air batteries such as Li-air and Zn-air, however, is the type of electrolyte utilized. The disclosed battery uses a solid $O^{2-}$-electrolyte whereas other "metal-air" batteries use a liquid $H^+$-electrolyte. More electrons involved in the charge-transfer process permit the SORFB to achieve higher storage-capacity at a higher rate.

As is apparent, the overall electrical cycle requires only steam as the feedstock. It is important to point out that the unutilized $H_2$ or $H_2O$ should also be recycled with the incoming steam to improve the "fuel" efficiency and performance stability. A pump created dynamic flow of steam can avoid mass-transport limitation and therefore stabilize the battery performance. In FIG. 1, an anode-supported tubular SORFB is schematically shown for illustration purpose. Anode-supported planar geometry can also be considered in the SORFB design, but with a more complicated steam flow scheme.

There are multiple advantages that can be perceived from the SORFB described herein. An advantage of the disclosed battery is the separation of the SOEC, from the volume-changing but free-standing $H_2$ generation/storage RCB, thus allowing it to perform simultaneous high-capacity and high-rate cycles without the concern of structural damages. The latter constraint has prevented most modern storage batteries from achieving a high rate-capacity. The SORFB described herein utilizes a Me/$MeO_x$ redox couple to store $H_2$ produced by an SOEC "in-batter" during the charging cycle. This capability is clearly advantageous over the conventional combined SOFC-SOEC storage device where the $H_2$ produced by SOEC must be either instantaneously consumed by SOFC or stored by $H_2$-storage tank at room-temperature and high pressure for later use. The latter is not an energy efficient process.

Another advantage of SORFB is the high energy efficiency inherited from those of SOFCs and SOECs. The about 45-55% electrical efficiency and about 85-90% overall energy efficiency demonstrated in SOFCs and SOECs promise the SORFB as an energy-efficient electricity storage device. Furthermore, since the processes of $H_2$ production and oxidation are both exothermic whereas those for metal reduction and $H_2O$ electrolysis are endothermic, the close integration of RCB with a solid oxide electrochemical cell would allow for an efficient heat transfer among the components and therefore a possibility to achieve a thermally self-sustaining unit.

Still another advantage of SORFB is that high-temperature operation facilitates kinetics of both electrode and redox reactions, yielding lower polarization losses, faster response time and higher kinetic rate constants. The depth of rechargeability can be controlled in multi-level manner by the mass ratio of Me/$MeO_x$ as well as the dynamic oxygen stoichiometry existed in the redox couple materials. These attributes will provide the SORFB described herein with a fast and deep rechargeability and the ability to follow the load greatly needed by large-scale grid electrical storage application.

The SORFB described herein allows for steam to be virtually the only "fuel" utilized to power the electrical cycles without $CO_2$ emission to the atmosphere. Therefore, the SORFB described herein is also an environmentally "green" technology. Other advantages inherited from SOFC/SOEC include corrosion-free, modularity, scalability and reliability, all of which are also much needed for the large-scale on-site stationary electrical storage for grid application.

Figure 2:
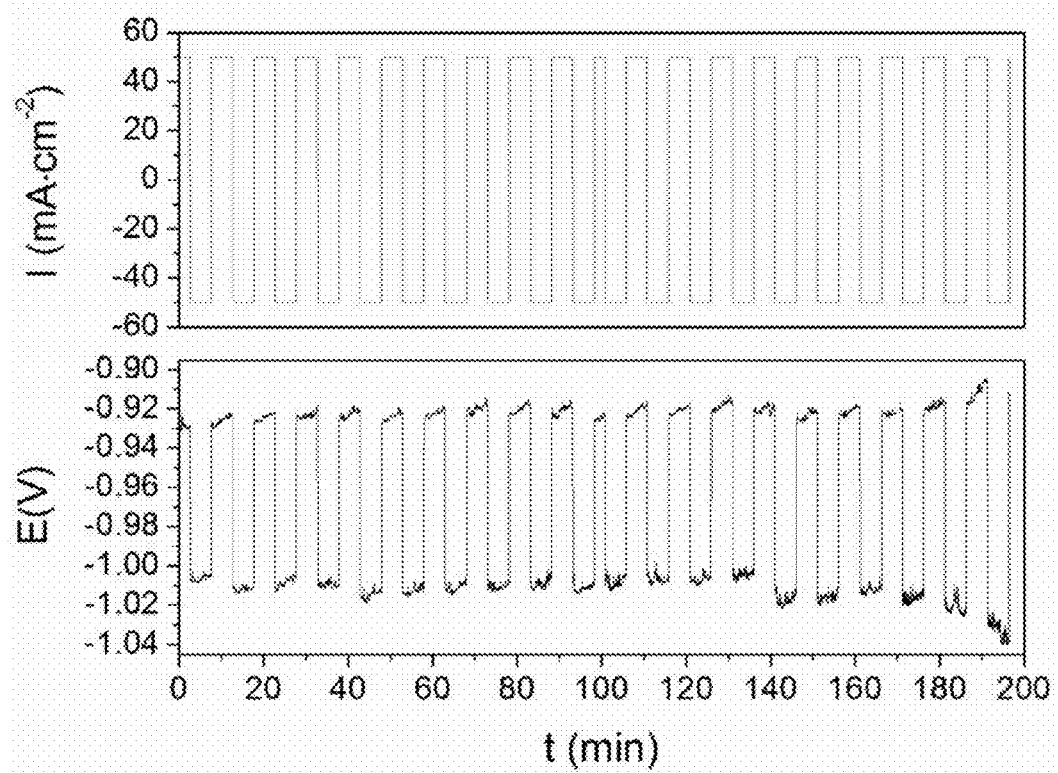
FIG. 2 illustrates charging and discharging characteristics of an SORFB operated at 800° C. in accordance with certain embodiments of the present disclosure.

FIG. 2 shows a plot of twenty charge/discharge cycles of the disclosed SORFB. The charging and discharging current densities were both kept at 50 mA/cm², and each charging or discharging cycle was held for 5 minutes. The energy release during 5-minute period was 20 Wh/kg Fe with an effective iron loading of 1.022 grams. The following features are also demonstrated in FIG. 2:

almost instantaneous response time;

the charging and discharging cycles are almost reversible, giving a round trip efficiency almost approximately 92%;

the projected energy release for 2-hour discharge is 190 Wh/kg Fe, higher than comparable lithium ion batteries and sodium sulfur batteries; and the charging and discharging voltages are relatively stable with time.

The chief challenge facing the solid oxide redox flow battery is the variable production rate of $H_2$ and $H_2O$ in the RCB throughout charge and discharge cycles, the characteristic of which is commonly represented by an initial rapid rise to the peak rate, followed by an exponential decay. To mitigate such variations in concentration, the reaction gas is allowed to flow in a closed-loop during the electrical cycles. The created dynamic flow also facilitates the transport of gaseous products and reactants between the SOEC and RCB, thus avoiding mass-transfer limitation that could be otherwise encountered in a stagnant system. The benefit from a flowing reaction gas is clearly seen in FIG. 3.

The thermodynamic perspectives of the new battery are directly related to the Gibbs free energy change of reaction (6). The theoretical open circuit voltage or Nernst potential (EN) and specific energy density (SED) of the battery using transition-metal/oxide pairs as the redox couples can be shown as a function of temperature. As expected, the couples containing metals with a greater oxygen affinity exhibit higher $E_N$ and SED because of the higher ($-\Delta G$) values. However, the performance of a storage battery also depends upon the reversibility of the metal-oxygen (or metal-steam) reaction to retain electrical cycles with high-capacity and high-efficiency. Selection of the Fe/FeO$_x$ redox-couple as described herein represents a balanced consideration of the thermodynamics and kinetics of the metal-steam reaction. The equilibrium phase composition in the Fe/FeO$_x$ redox couple under the operating condition was first determined by the Electromotive Force (EMF) technique using SOEC as an oxygen concentration cell. The measured EMF or Nernst potential $E_N$ (vs air) as a function of H$_2$O content in a closed flow of two different gases can be shown, N$_2$—H$_2$O and H$_2$—H$_2$O. In the case of N$_2$—H2O, $E_N$=0.970 volt is invariant with H$_2$O content whereas in the case of H$_2$—H$_2$O, $E_N$=0.970 volt only occurs above ca. 35% H2O. The thermodynamic calculations predict the equilibrium partial pressure ratio of H$_2$ and H$_2$O (pH$_2$O/pH2) to be 34.9/65.1 for the steam-iron reaction Fe+H$_2$O=FeO+H$_2$ occurring at 800° C.; the pH$_2$O/pH$_2$=34.9/65.1 corresponds to an $E_N$ 0.970 volt. The excellent agreement of the experimental data with the thermodynamic calculations indicates Fe and FeO as the phases prevalent in the redox material.

Figure 3A:
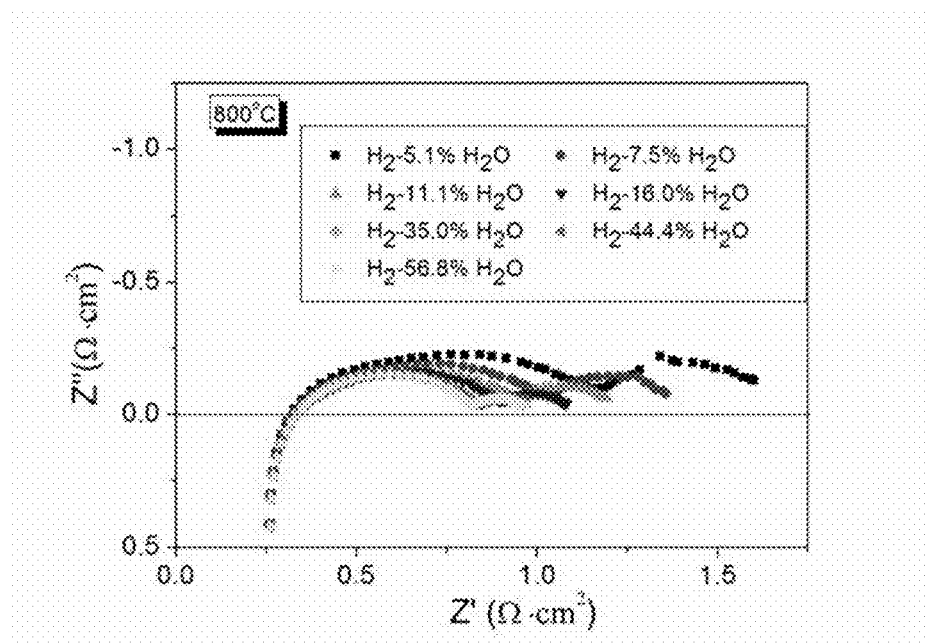
FIGS. 3 A-C illustrate impedance spectra of the battery measured under open circuit voltage in a closed flow of (a) $H_2$—$H_2O$ and (b) $N_2$—$H_2O$ (c) V-I characteristic of the battery measured under a closed-loop flow of $N_2$-$xH_2O$ in accordance with certain aspects of the present disclosure.
Figure 3B:
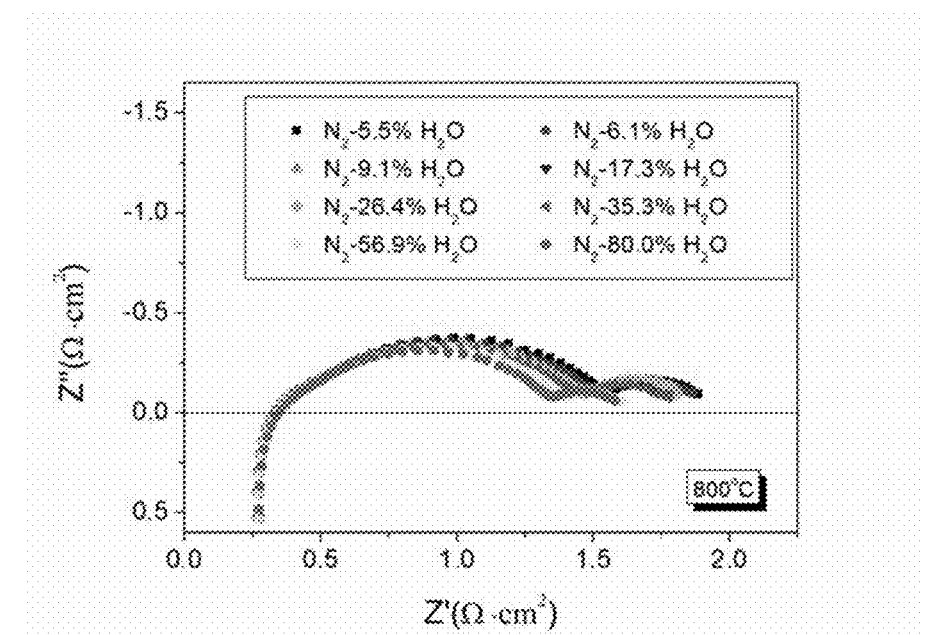
Figure 3C:
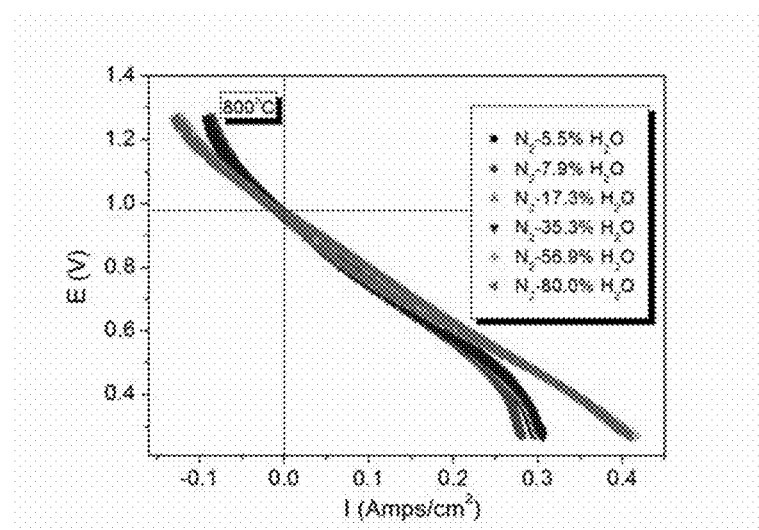

One aspect of the present disclosure is that $E_N$ is virtually controlled by the thermodynamic equilibrium between Fe and FeO with the actual mass ratio of Fe:FeO varying with the state of charge or discharge. The AC impedance spectra shown in FIGS. 3 (a) and (b) further support the two-phase equilibrium by revealing unchanged intermediate-to-low-frequency electrode resistance above ca. 35% H$_2$O in H$_2$—H$_2$O mixture and a small systematic reduction of the intermediate-to-low-frequency electrode resistance with increasing H$_2$O in the N$_2$—H$_2$O mixture; latter apparently results from a reduced N$_2$-dilution effect while pO$_2$ is being fixed by the Fe—FeO equilibrium. The systematic reduction in intermediate-to-low-frequency electrode resistance below ca. 35% H2O also confirms that it is an anode-related process with the lowest frequency semicircle likely being the gas diffusion process. The V-I characteristic of the battery cell measured under both fuel cell and electrolysis modes in a closed-loop flow of N$_2$-x % H$_2$O is shown in FIG. 3 (c). It is evident that the SOEC exhibited a higher resistance for electrolysis than for fuel cell in this case. Above ~57% H$_2$O, the cell performance is almost indiscernible. The H$_2$O content used in this study was ~53%, close enough to avoid significant N$_2$-dilution effect.

Figure 4A:
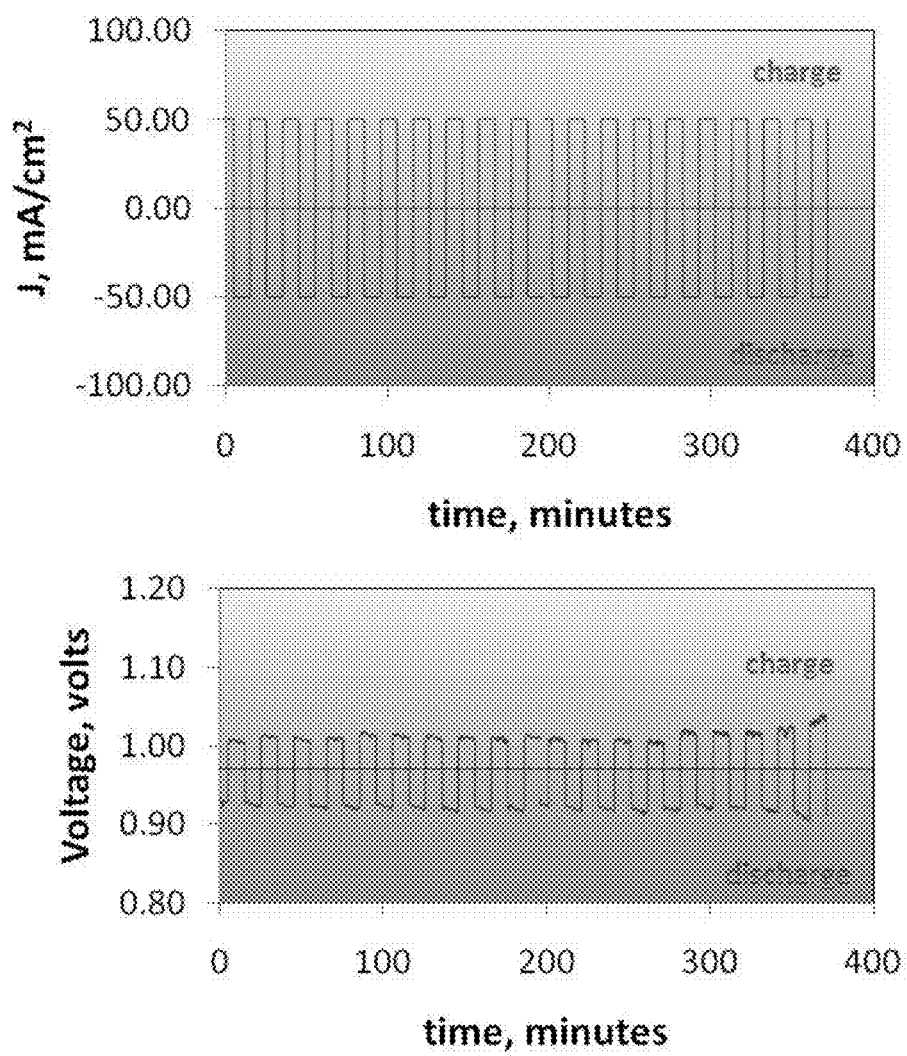
FIGS. 4 A-B illustrate charge and discharge characteristic of the battery at 800° C. and J=50 mA/cm²; the break on the curve at ~200 minutes marks the start of second 10-cycle run; (b) Plot of energy capacity as a function of the number of charge and discharge cycles; all data were measured with a closed-loop flow of 53.2% $H_2O$—$N_2$.
Figure 4B:
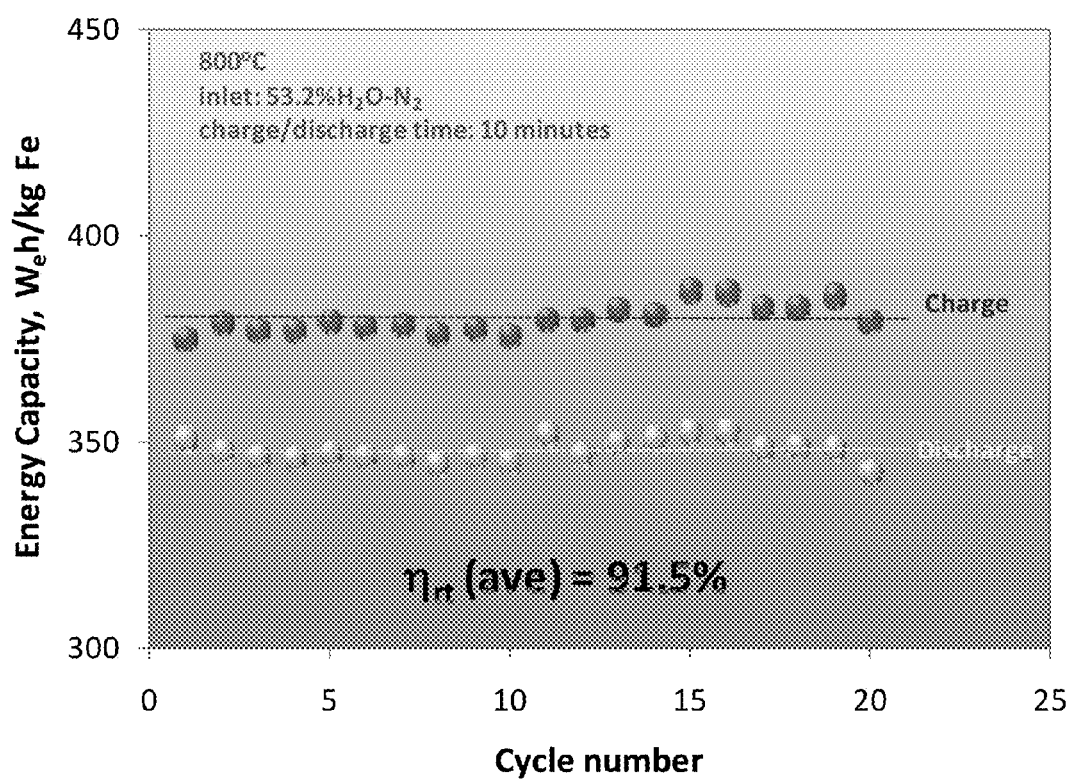

The charging/discharging characteristic of the SORFB is shown in FIG. 4 (a), where two consecutive ten charge/discharge cycles measured at a constant current density of 50 mA/cm$^2$ and with a 10-minute single-cycle period are combined as one plot. The characteristic of a rechargeable battery is explicitly observed with stable performance for all the twenty cycles performed. The responses of the battery to the charge and discharge commands are instantaneous. The corresponding energy capacity calculated from integration of the voltage-time curve multiplied by the galvanic current is shown in FIG. 4 (b). The battery produces an energy density of 348 W$_e$h/kg-Fe averaged from the 20 electrical cycles with a 38.5% Fe utilization. This energy output is compared with the energy input during the charge cycle to yield an averaged round-trip efficiency of η=91.5%. Based on the capacity attained at 50 mA/cm$^2$ and 38.5% Fe utilization, we can project an energy capacity of 886 W$_e$h/kg-Fe for 100% Fe utilization or full discharge, which comes close to about 95% of the theoretical 932 W$_e$h/kg-Fe (or charge capacity 960 Ah/kg-Fe). Such a close agreement favorably supports the validity of experimental data obtained. The charge/discharge time of the battery can be easily scaled-up to hour-level for meaningful practical applications by simply increasing the Fe loading. The rate of rechargeability (50 mA/cm2) demonstrated by the SORFB is at least one order of magnitude higher than Li-ion battery (~5 mA/cm2) and at a similar magnitude to RFB. However, much higher current density, e.g., 300 mA/cm$^2$, is very achievable for an SOEC.

From an engineering point of view, thermal management of heat flow (TΔS=71.1 kJ/mole at 800° C. for reaction (6)) during exothermic discharge and endothermic charge cycles is important to achieve a practically important thermally self-sustaining battery system. Strategies such as implementing an "in-battery" thermal storage unit to store the heat produced during the discharge cycle and release it during the charge cycle or operating the charge cycle (electrolysis) at a thermo-neutral potential have been considered in accordance with the present disclosure.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only, and is not intended to limit the disclosure so further described in such appended claims.

What is claimed:

1. A solid oxide redox flow battery comprising:
  a solid oxide electrochemical cell, the solid oxide electrochemical cell being configured to operate in a fuel cell mode and in an electrolysis mode, the solid oxide electrochemical cell including an anode, a cathode, and a solid oxygen-ion conducting electrolyte;
  a redox couple bed in fluid communication with the solid oxide electrochemical cell, the redox couple bed comprising a porous nanostructure, the porous nanostructure being formed of a porous nanostructured metal and its metal oxide;
  a first fluid flow path by which the porous nanostructure is configured to interact with steam during the fuel cell mode resulting in oxidation of the metal to form the metal oxide and produce hydrogen and further resulting in the oxidation of the hydrogen by oxygen-ion from the solid oxygen-ion conducting electrolyte to produce steam and the discharge of electricity from the battery;
  a second fluid flow path by which the porous nanostructure is configured to interact with hydrogen produced at the solid oxide electrochemical cell by the electrolysis of steam during a charge of electricity to the battery, the redox couple bed being capable of storing the hydrogen produced at the solid oxide electrochemical cell prior to interaction between this hydrogen and the metal oxide, the interaction between this hydrogen and the metal oxide resulting in reduction of the metal oxide to form the metal and the production of steam.

2. The battery as in claim 1, wherein the electrolyte comprises yttria stabilized zirconia, scandia stabilized zirconia, strontium- and magnesium doped lanthanum gallate and gadolinium, or samarium doped ceria.

3. The battery as in claim 1, wherein the anode is a porous structure.

4. The battery as in claim 3, wherein the porous anode comprises a cermet.

5. The battery as in claim 1, further comprising an interconnect material.

6. The battery as in claim 1, wherein the metal in the redox couple bed comprises Fe.

7. The battery as in claim 1, wherein the metal oxide comprises FeO.

8. A method of discharging a solid oxide redox flow battery during a fuel cell mode and charging the solid oxide redox flow battery during an electrolysis mode, the method comprising:
   during the fuel cell mode, feeding steam to a redox couple bed, the redox couple bed comprising a porous nanostructure, the porous nanostructure being formed of a porous nanostructured metal and its metal oxide, wherein upon feeding the steam to the redox couple bed the metal oxide and hydrogen are formed, the hydrogen flowing to a solid oxide electrochemical cell, the solid oxide electrochemical cell including an anode, a cathode, and a solid oxygen-ion conducting electrolyte, the hydrogen being electrochemically oxidized at the electrochemical cell to generate electricity and steam;
   during the electrolysis mode, feeding hydrogen produced by electrochemically splitting steam at the solid oxide electrochemical cell to the redox couple bed;
   storing the hydrogen thus produced during the electrolysis mode in the redox couple bed; and
   reacting the hydrogen stored in the redox couple bed with the metal oxide resulting in reduction of the metal oxide to the metal and formation of steam.

9. The method as in claim 8, wherein the electrolyte comprises yttria stabilized zirconia, scandia stabilized zirconia, strontium and magnesium doped lanthanum gallate and gadolinium, or samarium doped ceria.

10. The method as in claim 8, wherein the anode is a porous structure.

11. The method as in claim 10, wherein the porous anode comprises a cermet.

12. The method as in claim 8, the solid oxide redox flow battery further comprising an interconnect material.

13. The method as in claim 8, further comprising feeding steam into the redox couple bed after feeding hydrogen to the redox couple bed.

14. The method as in claim 8, wherein the metal comprises Fe.

15. The method as in claim 8, wherein the metal oxide comprises FeO.

16. The method as in claim 8, wherein steam is a feedstock to the solid oxide redox flow battery.

17. The method as in claim 8, wherein the redox couple bed defines a volume, the volume of the redox couple bed changing over the course of the method.

18. The method as in claim 8, wherein the method is a thermally self-sustaining method.

19. The battery as in claim 1, wherein the battery comprises a plurality of cells in series.

20. The battery as in claim 1, wherein the battery is an anode supported tubular solid oxide battery.

* * * * *